United States Patent
Nachmanson et al.

(10) Patent No.: US 7,590,520 B2
(45) Date of Patent: Sep. 15, 2009

(54) NON-DETERMINISTIC TESTING

(75) Inventors: Lev Borisovich Nachmanson, Redmond, WA (US); Margus Veanes, Bellevue, WA (US); Wolfgang Grieskamp, Redmond, WA (US); Nikolai Tillmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 10/758,797

(22) Filed: Jan. 15, 2004

(65) Prior Publication Data

US 2005/0160404 A1  Jul. 21, 2005

(51) Int. Cl.
G06F 9/45 (2006.01)
G06F 9/44 (2006.01)
G06F 11/00 (2006.01)

(52) U.S. Cl. .................. 703/22; 717/124; 717/126; 714/37

(58) Field of Classification Search .................. 703/22; 714/30, 38, 37; 717/124, 126
See application file for complete search history.

(56) References Cited

U.S. PATENT DOCUMENTS

| | | | |
|---|---|---|---|
| 5,555,270 A * | 9/1996 | Sun et al. .................. 714/738 |
| 5,623,499 A * | 4/1997 | Ko et al. .................. 714/724 |
| 5,630,051 A * | 5/1997 | Sun et al. .................. 714/32 |
| 5,659,554 A * | 8/1997 | Okayasu .................. 714/738 |
| 5,659,555 A * | 8/1997 | Lee et al. .................. 714/738 |
| 5,703,885 A * | 12/1997 | Sun et al. .................. 714/738 |
| 5,761,408 A * | 6/1998 | Kolawa et al. .................. 714/38 |
| 5,784,553 A * | 7/1998 | Kolawa et al. .................. 714/38 |
| 5,796,752 A * | 8/1998 | Sun et al. .................. 714/738 |
| 6,004,027 A * | 12/1999 | Sun et al. .................. 714/741 |
| 6,282,681 B1 * | 8/2001 | Sun et al. .................. 714/738 |
| 6,910,000 B1 * | 6/2005 | Yedidia et al. .................. 703/2 |
| 7,055,065 B2 * | 5/2006 | Farchi et al. .................. 714/38 |
| 7,088,864 B2 * | 8/2006 | Grieskamp et al. .................. 382/232 |
| 7,149,678 B2 * | 12/2006 | Gurevich et al. .................. 703/22 |
| 7,290,193 B2 * | 10/2007 | Kadkade et al. .................. 714/742 |
| 2003/0046609 A1 * | 3/2003 | Farchi et al. .................. 714/30 |
| 2003/0159087 A1 * | 8/2003 | Grieskamp et al. .................. 714/37 |
| 2003/0159132 A1 | 8/2003 | Barnett et al. |
| 2003/0191797 A1 * | 10/2003 | Gurevich et al. .................. 709/200 |
| 2005/0050391 A1 | 3/2005 | Grieskamp et al. |
| 2005/0050536 A1 | 3/2005 | Grieskamp et al. |
| 2005/0198621 A1 | 9/2005 | Tillmann et al. |
| 2005/0229044 A1 * | 10/2005 | Ball .................. 714/38 |
| 2006/0242123 A1 * | 10/2006 | Williams, Jr. .................. 707/3 |

OTHER PUBLICATIONS

Kranzlmüller andV olkert, "NOPE: A Nondeterministic Program Evaluator", Parallel Computation: 4th International ACPC Conference Including Special Tracks on Parallel Numerics (ParNum'99) and Parallel Computing in Image Processing, Video Processing, and Multimedia, Salzburg, Austria, Feb. 1999. Proceedings, pp. 490-499.*

(Continued)

*Primary Examiner*—Kamini S Shah
*Assistant Examiner*—David Silver
(74) *Attorney, Agent, or Firm*—Klarquist Sparkman, LLP

(57) ABSTRACT

A computerized method creates test coverage for non-deterministic programs. The method receives a graph of edges and states representing a program under test, and creates a continuous cycle of edges that reaches each edge in the graph at least once. In one example, the method splits the continuous cycle into discrete sequences that end at edges reaching non-deterministic nodes in the graph, and verifies that the executing program conforms to the behavior represented by the discrete sequences. In another example, a method creates probabilistic strategies for reaching one or more vertices in a non-deterministic graph. The strategies provide a graph path with a high probability of reaching a desired vertex.

10 Claims, 14 Drawing Sheets

OTHER PUBLICATIONS

Elsa Gunter et al, "Computer Aided Verification", 2000, Springer, pp. 552-556, DOI 10.1007/10722167_43, http://www.springerlink.com/content/vn4432vu504q6k42.*

Wolfgang Grieskamp, Yuri Gurevich, Wolfram Schulte and Margus Veanes, "*Generating Finite State Machines from Abstract State Machines*", Technical Report MSR-TR-2001-97, Oct. 2001 (Revised May 2002), 19 pages.

T. K. Ralphs, "*On the Mixed Chinese Postman Problem*", Jun. 8, 1993, 7 pages.

Mike Barnett and Wolfram Schulte, "*Spying on Components: A Runtime Verification Technique*", OOPSLA 2001 Workshop on Specification and Verification of Component-Based Systems, Oct. 2001, 7 pages.

Yuri Gurevich, Wolfram Schulte and Margus Veanes, "*Toward Industrial Strength Abstract State Machines*", Technical Report MSR-TR-2001-98, Oct. 2001, 12 pages.

"*Executable Specifications: Creating Testable, Enforceable Designs*", Foundations of Software Engineering, Feb. 9, 2001, 15 pages.

Alur et al., "Distinguishing tests for nondeterministic and probabilistic machines," in *Proc. 27$^{th}$ Ann. ACM Symp Theory of Cumputing*, pp. 363-372, 1995.

Artho et al., "Experiments with Test Case Generation and Runtime Analysis," in Börger, Gargantini, and Riccobene, editors, *Abstract State Machines 2003*, vol. 2589 of LNCA, pp. 87-107, Springer, 2003.

Barnett et al., "Model-Based Testing with AsmL.Net," *Microsoft Research*, 8 pages.

Barnett et al., "Towards a Tool Environment for Model-Based Testing with AsmL," in Petrenko and Ulrich, editors, *Formal Approaches to Software Testing*, FATES 2003, vol. 2931 of LNCS, pp. 252-266, Springer, 2004.

Barnett et al., "Validating Use-Cases with the AsmL Test Tool," *Proceedings of the Third International Conference on Quality Softwre (QSIC '03)*, 9 pages, 2003.

Box, "A Guide to Developing and Running Connected Systems with Indigo," *MSDN Magazine*, 8 pages, 2003.

Brinksma et al., "Testing Transition Systems: An Annotated Bibliography," in *Summer School MOVEP '2k—Modelling and Identification of Parallel Processes*, vol. 2067 of LNCS, 10 pages, Springer, 2001.

Campbell et al., "Model-Based Testing of Object-Oriented Reactive Systems with Spec Explorer," *Technical Report MSR-TR-2005-59*. Microsoft Research, pp. 1-34, May 2005.

Condon, "The Complexity of Stochastic Games," *Information and Computation*, 96(2), 17 pages, 1992.

Fernandez et al., "An experiment in automatic generation of test suites for protocols with verification technology," *Science of Computer Programming—Special Issue on COST247, Verification and Validation Methods for Formal Descriptions*, 29(1-2): 123-146, 1997.

Filar et al., "Competitive Markov Decision Processes," Springer Berlin, pp. 1-6, 1996.

Fujiwara et al., "Testing non-deterministic state machines with fault coverage," in Kroon, Heijink and Brinksma, editors, *Protocol Test Systems, IV*, pp. 267-280, 1992.

Gibbons, "*Algorithmic Graph Theory*," Cambridge University Press, 1985.

Greenlaw et al., "*Limits to Parallel Computation: P-Completeness Theory*," Oxford University Press, 1995.

Grieskamp et al., "Generating Finite State Machines from Abstract State Machines," in *ISSTA '02*, vol. 27 of *Software Engineering Notes*, pp. 112-122, ACM, 2002.

Grieskamp et al., "Testable Use Cases in the Abstract State Machine Language," *Microsoft Research*, pp. 167-172, 2001.

Gurevich, "Evolving Algebras 1993: Lipari Guide," in Börger, editor, *Specification and Validation Methods*, Oxford University Press, pp. 1-26, 1995.

Hartman et al., "Model Driven Testing—AGEDIS Architecture Interfaces and Tools," in *1$^{st}$ European Conference on Model Drive Software Engineering*, pp. 1-11, 2003.

Jones et al., "Complete Problems for Deterministic Polynomial Time," *Theoretical Computer Science*, pp. 40-46, 1976.

Kuliamin et al., "UniTesK: Model Based Testing in Industrial Practice," in *1$^{st}$ European Conference on Model Driven Software Engineering*, 9 pages, 2003.

Lee et al., "Principles and Methods of Testing Finite State Machines—A Survey," in *Proceedings of the IEEE*, vol. 84, pp. 1090-1123, 1996.

Mehlhorn et al., "A Heuristic for Dijkstra's Algorithm with Many Targets and its Use in Weighted Matching Algorithms," in Meyer, editor, *Algorithms—ESA 2001: 9$^{th}$ Annual European Symposium*, vol. 2161 of LNCS, 12 pages, Springer, 2001.

Muchnick, "Advanced Compiler Design & Implementation," Morgan Kaufmann Publishers, San Francisco, CA, 1997.

Nachmanson et al., "Optimal Strategies for Testing Nondeterministic Systems," in *ISSTA '04*, vol. 29, *Software Engineering Notes*, 10 pages, ACM, 2004.

Puterman, "Markov Decision Processes: Discrete Stochastic Dynamic Programming," Wiley Series in Probability and Mathematical Statistics, John Wiley and Sons, Inc., 1994.

Sidhu et al., "Formal Methods for Protocol Testing: A Detailed Study," 15(4):413-426, 1989.

Tretmans et al., "TorX: Automated Model Based Testing," in *1$^{st}$ European Conference on Model Driven Software Engineering*, 13 pages, 2003.

Zhang et al., "Optimal Transfer Trees and Distinguishing Trees for Testing Observable Nondeterministic Finite-State Machines," *IEEE Transactions on Software Engineering*, 29(1):1-14, 2003.

* cited by examiner

```
       Initilalize() {
602      front:=P // P is victory set
604      newfront:={}
606
608      foreach v in P // initialize vertices of victory set
610        foreach i from 0 to n { // n is number of maximum edges allowed
612          Pr(v,i):=1 // vertices of victory set have probability of 1
614          C(v,i):=0 // no edge costs since this is victory set
616          S(v,i):=null // no strategies leave the victory set
618        }

620      foreach v in V-P {
622        for each i from 0 to n {
624          Pr(v,i):=0 // all other vertices initialized with zero probability,
626          C(v,i):=0 //                                      cost and strategy
628          S(v,i):=null //
           }
       }
```

FIG. 7

| VERTEX | PROB COST STRATEGY | N = 0... 4 | | | | |
|---|---|---|---|---|---|---|
| | | 0 | 1 | 2 | 3 | 4 |
| V | PR | 1 | 1 | 1 | 1 | 1 |
| | C | 0 | 0 | 0 | 0 | 0 |
| | S | NULL | NULL | NULL | NULL | NULL |
| A | PR | 0 | 0 | 0 | 0 | 0 |
| | C | 0 | 0 | 0 | 0 | 0 |
| | S | NULL | NULL | NULL | NULL | NULL |
| B | PR | 0 | 0 | 0 | 0 | 0 |
| | C | 0 | 0 | 0 | 0 | 0 |
| | S | NULL | NULL | NULL | NULL | NULL |
| G | PR | 0 | 0 | 0 | 0 | 0 |
| | C | 0 | 0 | 0 | 0 | 0 |
| | S | NULL | NULL | NULL | NULL | NULL |
| C | PR | 0 | 0 | 0 | 0 | 0 |
| | C | 0 | 0 | 0 | 0 | 0 |
| | S | NULL | NULL | NULL | NULL | NULL |
| D | PR | 0 | 0 | 0 | 0 | 0 |
| | C | 0 | 0 | 0 | 0 | 0 |
| | S | NULL | NULL | NULL | NULL | NULL |

```
802   StrategyCalculation(n){
804     for (i=1; i<=n; i++){
806       foreach v in front
808         Process(v,i)
810       foreach v in newfront
812         foreach k:=i+1;k<=n;k++ {
814           S(v,k):=S(v,i)
816           Pr(v,k):=Pr(v,i)
818           C(v,k):=C(v,i)
            }

820       Visited+=newfront
822       front:=newfront
824       newfront:={}

```
902   Process(vertex v,i){
904      foreach edge entering v {
906         let u=edge.source // u is the source vertex of edge
908         if u is not in P // never exit from P, the victory set
910            if u is deterministic
912               if ImprovingOnEdge( edge,i){
914                  S(u,i):=edge
916                  Pr(u,i):=Pr(v,i-1)
918                  C(u,i):=cost(edge)+C(v, i-1)
920                  newfront:=newfront U {u}  // add u to newfront
                  }
922            else {//the node edge.source is nondeterministic 924               oldPr=Pr(u,i)
926               oldC= C(u,i)
928               if i>1 then
930                  Pr(u,i)+=p(edge)(Pr(v,i-1)-Pr(v,i-2))
                  else
932                  Pr(u,i)+=p(edge)Pr(v,i-1)

934               C(u,i) = max{cost(e)+ C(e.target,i-1): e exits from u}

936               if( oldPr ≠ Pr(u,i) or oldC ≠ C(u,i))
938                  newfront:=newfront U {u}
               }
            }
         }

940   bool ImprovingOnEdge(edge, v, i)
            return
942      (Pr(edge.target,i-1),cost(edge)+ C(edge.target,i-1)) <
         (Pr(edge.source,i),C(edge.source,i))
```

| VERTEX | PROB COST STRATEGY | N = 0...4 | | | | |
|---|---|---|---|---|---|---|
| | | 0 | 1 | 2 | 3 | 4 |
| V | PR | 1 | 1 | 1 | 1 | 1 |
| | C | 0 | 0 | 0 | 0 | 0 |
| | S | NULL | NULL | NULL | NULL | NULL |
| A | PR | 0 | 0 | 1/2 | 2/3 | 3/4 |
| | C | 0 | 0 | 2 | 3 | 4 |
| | S | NULL | NULL | AC | AB | AC |
| B | PR | 0 | 0 | 2/3 | 2/3 | 2/3 |
| | C | 0 | 0 | 2 | 2 | 2 |
| | S | NULL | NULL | BG | BG | BG |
| G | PR | 0 | 2/3 | 2/3 | 2/3 | 2/3 |
| | C | 0 | 1 | 1 | 1 | 1 |
| | S | NULL | NULL | NULL | NULL | NULL |
| C | PR | 0 | 1/2 | 1/2 | 1/2 | 1/2 |
| | C | 0 | 1 | 1 | 1 | 1 |
| | S | NULL | NULL | NULL | NULL | NULL |
| D | PR | 0 | 0 | 1/2 | 1/2 | 1/2 |
| | C | 0 | 0 | 2 | 2 | 2 |
| | S | NULL | NULL | DC | NULL | NULL |

FIG. 12

```
Traverse(node v,integer k){ while (k>0){
        k:=k-1
        let e=edge choosen by the environment

Ti:=choose any Ti starting with e
        cover every edge of Ti
        v:=end of Ti
    }
}
```

NON-DETERMINISTIC TESTING

TECHNICAL FIELD

The technical field relates to testing strategies for testing applications including non-deterministic state transitions.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Abstract state machines provide models for testing program behavior. See Executable Specifications: Creating Testable, Enforceable Designs, Microsoft Research, Feb. 9, 2001. An abstract state machine language provides language constructs for describing desirable program behavior. See Gurevich, et al., Toward Industrial Strength Abstract State Machines, Microsoft Research, October 2001. These language constructs are compiled into a verifiable model of program behavior including states and state transitions. Programs are exercised and verified against a model, and non-determinism is discussed as bounded sets. See Barnett, et al., Spying on Components: A Runtime Verification Technique, Microsoft Research, October 2001. Abstract state machines are used to generate tests for verifying programs. See Generating Finite State Machines from Abstract State Machines, Grieskamp, et al., Microsoft Research, May 2002. A Chinese Postman Tour is described for providing coverage of a deterministic finite state machine modeling program behavior. Id. However, some programs such as network protocols and distributed applications, depend on external behavior. There is presently no method for modeling or verifying program behavior that includes traversing and providing coverage to vertices or edges reachable through a non-deterministic graph.

SUMMARY

The described technologies provide methods and systems for providing models and test coverage for non-deterministic programs.

In one example, a model containing deterministic and non-deterministic vertices is verified against a program's behavior. In one such example, a graphing program creates a continuous cycle touching all edges of the abstract state machine model of the program, and the continuous cycle is split into discrete sequences that end at non-deterministic states. In one example, a coverage program verifies whether the executing program traverses states corresponding to those modeled by the discrete sequences. In another example, a strategy calculation program creates strategies more likely to reach the untouched discrete sequences and the coverage program verifies whether the strategies provide coverage to the untouched discrete sequences.

In another example, a computerized method creates test coverage for non-deterministic programs. The method receives a graph of edges and states representing a program under test, and creates a continuous cycle that reaches each edge in the graph at least once. In one example, the method splits the continuous cycle into discrete sequences that end at edges reaching non-deterministic nodes in the graph, and verifies that the executing program conforms to the behavior represented by the discrete sequences. In another example, a method creates probabilistic strategies for reaching one or more vertices in a non-deterministic graph. The strategies provide a graph path with a high probability of reaching a desired vertex.

Additional features and advantages will be made apparent from the following detailed description, which proceeds with reference to the accompanying drawings.

BRIEF DESCRIPTION OF THE DRAWINGS

FIG. 6 is a program listing of an exemplary method that initializes data structures for determining a strategy through a non-deterministic graph.

FIG. 7 is a diagram of an exemplary data structure initialized according to the program listing of FIG. 6.

FIG. 9 is a program listing for comparing and propagating reaching strategies.

FIG. 12 is a program listing of a method of cycle traversal used to obtain test coverage probabilistically.

DETAILED DESCRIPTION

Overview

Figure 1:
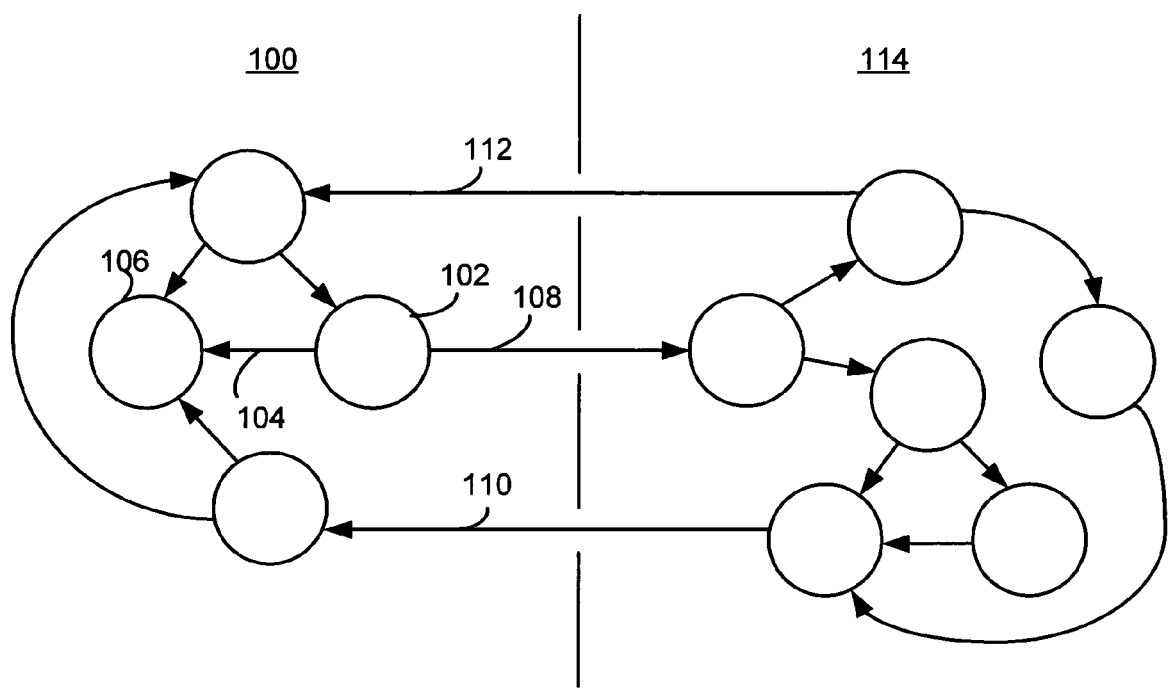
FIG. 1 is a diagram of an application under test requesting services from a non-deterministic service.

Software testing often involves testing as many combinations of program states as possible. Often, test coverage is modeled as a graph with edges and nodes. The described technologies provide an improved method for obtaining testing coverage for software applications that behave non-deterministically. In one example, a Chinese Postman tour is split into sequences that are applied to provide some global edge coverage. For the remaining uncovered edges starting from deterministic nodes, various techniques are applied for reaching nondeterministic edges with some probability.

The technologies introduce methods and systems for providing probabilistic testing of an application behaving non-deterministically. In one example, the testing of such an application is reduced to a game on a graph with some vertices marked as choice points. In the game, a player plays against an environment. Both the player and the environment move from vertex to vertex following the edges of the graph. If a vertex stands at a non-choice point, the player makes a move by choosing an edge exiting the vertex. If the selected vertex is a choice point, then the environment makes a move choosing an edge exiting the vertex non-deterministically, but with known or assigned probabilities.

An example of such an application can be a network protocol where the network is the environment, and the network can lose a message with some probability. In another example, an application is a game such as Blackjack or Roulette, where the player makes moves from deterministic vertices and the environment makes moves from non-deterministic vertices according to known or assigned probabilities.

In one example, a method traditionally used with deterministic graph traversal is considered with probabilistic adaptations. First, in order to cover as many edges of the graph as possible, a Chinese Postman tour algorithm provides a minimal cost tour covering all edges. Next, the tour of the graph is split into sequences such that no sequence contains choice points (i.e., non-deterministic vertices or states) as an internal point. If a player covers all sequences playing the game, then all edges are covered. A string starting from each non-deterministic choice is provided. The environment chooses non-deterministically an edge exiting the selected vertex. The player then follows any sequence starting at the edge destination and continues play from the non-deterministically selected vertex. In one example, the probability to cover all edges converges to one geometrically when the number of steps in a strategy approaches infinity.

Sometimes in testing, a test needs to reach a set of application states, for example, to find an error. In such an example, a model finite state machine (e.g., graph) is created in order to create inputs that reach some predefined set of vertices representing application states. A player can select a strategy based on a probability of a selected vertex to reach a desired state, and the maximal cost of the strategy or path to the desired state. An order on the probability and costs associated with different paths through a graph are compared such that, in one example, a probability cost pair (i.e., a couple) with maximum probability and minimum cost will is preferred over other couples. The comparison or order suggests to the player a move for reaching a target state with a better probability and for minimal cost.

Strategies are provided which are optimal in some sense for reaching application states deterministically and with probability. In one example, these technologies are used in a testing tool such as AsmLT™, by Microsoft™ Corporation.

Exemplary Abstract State Machines

Abstract state machines are used to simulate and/or test program behavior as discussed in U.S. application Ser. No. 10/112,319, filed Mar. 28, 2002, U.S. application Ser. No. 10/650,245, filed Aug. 27, 2003, U.S. application Ser. No. 10/071,524, filed Feb. 8, 2002, U.S. application Ser. No. 10/081,329, filed Feb. 20, 2002, and U.S. application Ser. No. 10/650,297, filed Aug. 27, 2003, all of which are incorporated herein by reference.

For example, by examining the state space of a program, it can be determined whether or not the program performs as expected. In one example, an abstract state machine is used to create inputs to a program under test. In another example, an abstract state machine is run in parallel with an application in order to verify that a program performs according to behavior expected by the states of an abstract state machine. In another example, a program is instrumented in a testing environment where its program behavior is tested according to an executable specification comprising an abstract state machine.

In one such example, an abstract state machine is represented as states modeling a program behavior, and the program is exercised in a testing environment to verify conformance with the modeled states.

In a testing environment, one of the goals is providing coverage of program behavior. This is modeled as states and edges representing or verifying program behavior. By reducing program states to nodes, and changing states as edges between nodes, graph theory is used to determine whether program test coverage has been attained. However, in general, graph theory rests on the proposition that a given graph can be traversed deterministically. However, in some programs under test, such as distributed programs, a testing environment is unable to control program behavior.

The described technology provides methods and systems for integrating graph theory into program testing in order to obtain probabilistic testing of otherwise non-deterministic program behavior. In one such example, the technology implements strategies to direct program execution through edges of the graph that create a higher probability of obtaining coverage of an edge choice not controllable in the test environment. In another example, when a non-deterministic choice is observed, a method provides a deterministic sequence in response to observing a non-deterministic choice.

Exemplary Non-Determinism in Applications

FIG. 1 is a diagram of an application under test requesting services from a non-deterministic service.

In one example, the application under test is a network protocol. In one such example, the application is in a state 102, and an action 104 causes the application to enter another state 106. However, in another example, the network protocol communicates with a remote service 108. Since the service is remote, the test environment has no control over states or transitions of the remote service 114. Thus, the behavior of the remote service is observed 112, 110 and reacted to instead of controlled.

In another example, an application is a distributed application, with a portion of the application under test at one computer testing environment 100, while another portion of the distributed application runs elsewhere 114, and is thus not controllable in the test environment 100. Thus, when remote services are requested 108, the test environment receives a non-deterministic response 112, 110.

Other non-deterministic scenarios are observed in other areas such as parallel processing, user interaction, or other factors not deterministic in a testing environment.

Exemplary Model

Figure 2:
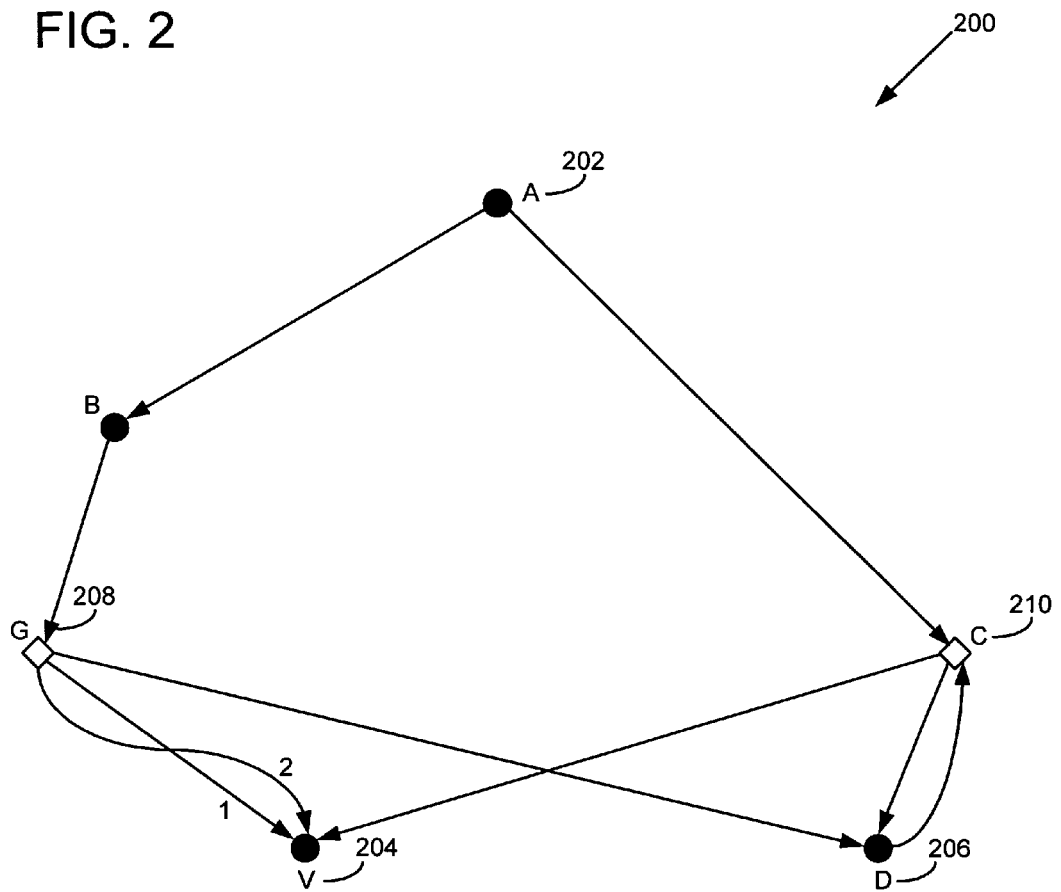
FIG. 2 is a graph diagram of exemplary states modeling an application under test.

FIG. 2 is a graph diagram of exemplary states modeling an application under test. In this example, states A, B, V, and D are deterministic and states G and C are non-deterministic. For example, if FIG. 2 is a model of an application such as discussed in FIG. 1, the deterministic states would be those states controllable in the testing environment 100, and the non-deterministic states would be those states not controlled by the testing environment. In one example, edge AB in the model would represent a request 108 to a non-deterministic state, and edge CD in the model, would represent an observed behavior 112. Thus, FIG. 2 represents a model created in the testing environment. The model (e.g., abstract state machine) includes behavior controllable and observable. One purpose of building the model (e.g., 200) is determining whether the application (e.g., 100) conforms to expected behavior.

A model developer assigns probabilities to the edges exiting the non-deterministic states. The described technologies traverse the model graph and provide strategies more likely to provide test coverage of the graph despite the non-determinism. For example, if a test developer desires to provide test coverage of a state reachable from a non-deterministic state, then the technology will execute a strategy with higher probability of reaching the non-deterministic state. This strategy can be repeated until the non-deterministic state chooses the desired coverage.

A strategy is a series of one or more edge transitions through the graph. For deterministic states, transitions are controllable in the testing environment (e.g., FIG. 2, AB, AC, BG, DC). Thus, the testing environment can obtain test coverage to all corresponding transition states. But once control is relinquished by the testing environment via a transition to a non-deterministic state (e.g., BG, AC, DC) the test environment then observes the non-deterministic behavior (e.g., $GV_1$, $GV_2$, GD, CV, CD). Therefore, when a developer desires testing a state reachable by a transition from a non-deterministic state (e.g., V or D), the developer desires a strategy that reaches the non-deterministic state. In one such example, one non-deterministic state (e.g., G or C) may have a higher probability of reaching a victor or target state (e.g., V) than the other. In another example, one path through the graph (e.g., ABGV versus ACV) may have a higher probability of reaching V. A strategy is one or more edge transitions determined by the described technology to have a higher probability of reaching a desired state and or a desired test coverage.

Exemplary Method of Obtaining Test Coverage

Figure 3:
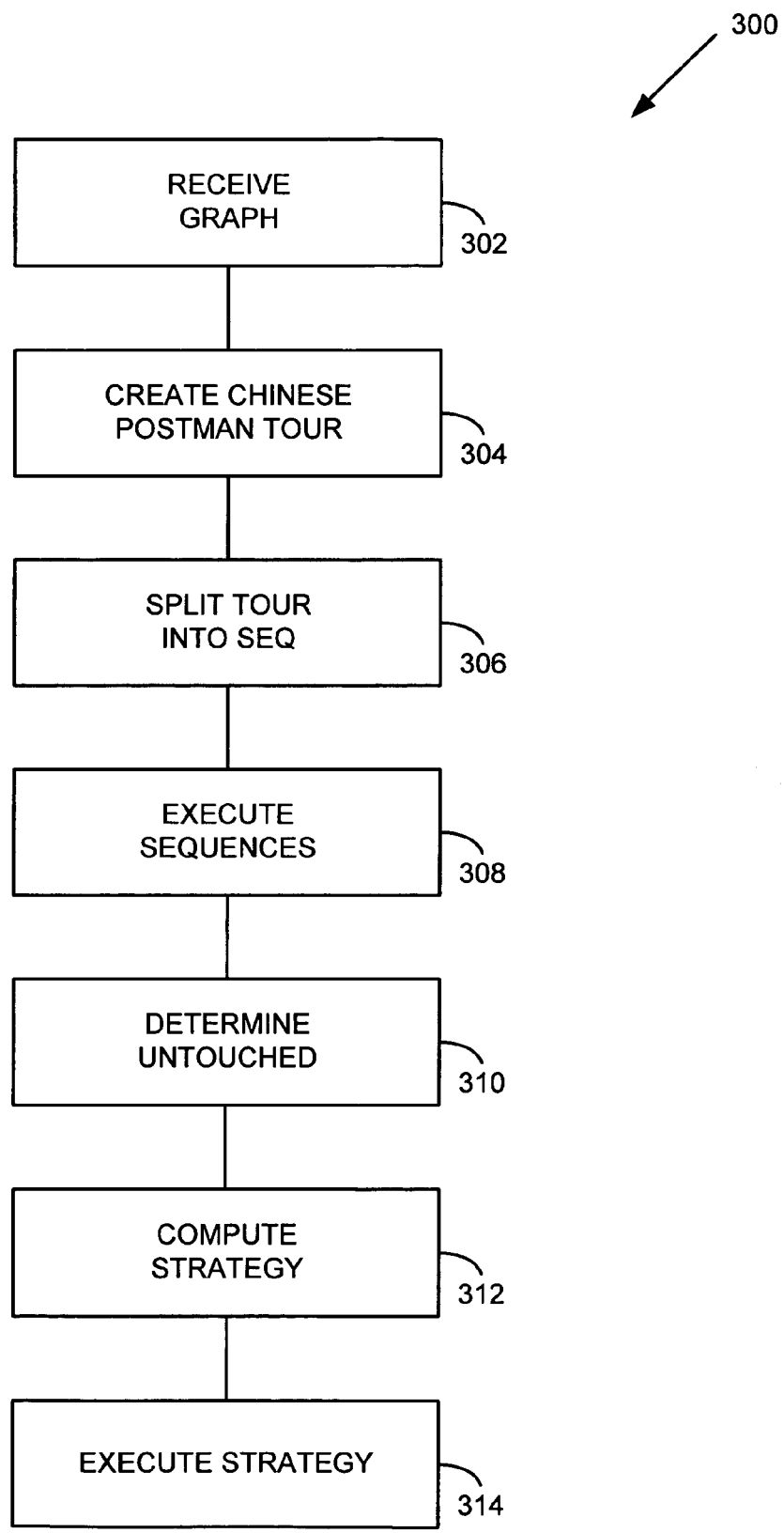
FIG. 3 is a flowchart of an exemplary method of obtaining non-deterministic test coverage.

FIG. 3 is a flowchart of an exemplary method of obtaining non-deterministic test coverage.

At 302, the method receives a graph definition. In one example, the graph is a set of deterministic vertices, non-deterministic vertices, edges, and an association of edges with probabilities.

At 304, the method creates a continuous cycle of edges through the graph that traverses all edges.

At 306, the method splits the continuous cycle into sequences ending at non-deterministic vertices.

At 308, the method executes the program in a test environment and verifies which sequences are covered.

At 310, the method determines untouched vertices or edges.

At 312, the method creates strategies through the graph that have a higher probability of touching untouched vertices or edges. For example, the method traverses the graph backwards starting from untouched vertices, and computes costs and probabilities at each vertex with an edge that reaches the untouched vertex. For non-deterministic vertices with edges reaching an untouched vertex, a probability is assigned based on the likelihood that the edge exiting the non-deterministic vertex will be selected. The method continues by stepping backward through the graph and assigning probabilities and costs to vertices based on the probability that they will be able to provide a path to an untouched vertex. Vertices that provide a higher probability of reaching an untouched vertex are selected as strategies.

At 314, the method then executes the program again, this time providing an execution path to the program through a set of states more likely to reach an untouched vertex. Since the program contains non-deterministic behavior (e.g., states), probability strategies only place non-deterministic entities (e.g., remote programs or behavior) in a position to select an untouched state. However, an untouched state is not guaranteed. In one example, by presenting a non-deterministic choice multiple times, it increases the possibility that a desired reaction will exercise a desired vertex in the program under test.

Exemplary System Obtaining Test Coverage

Figure 4:
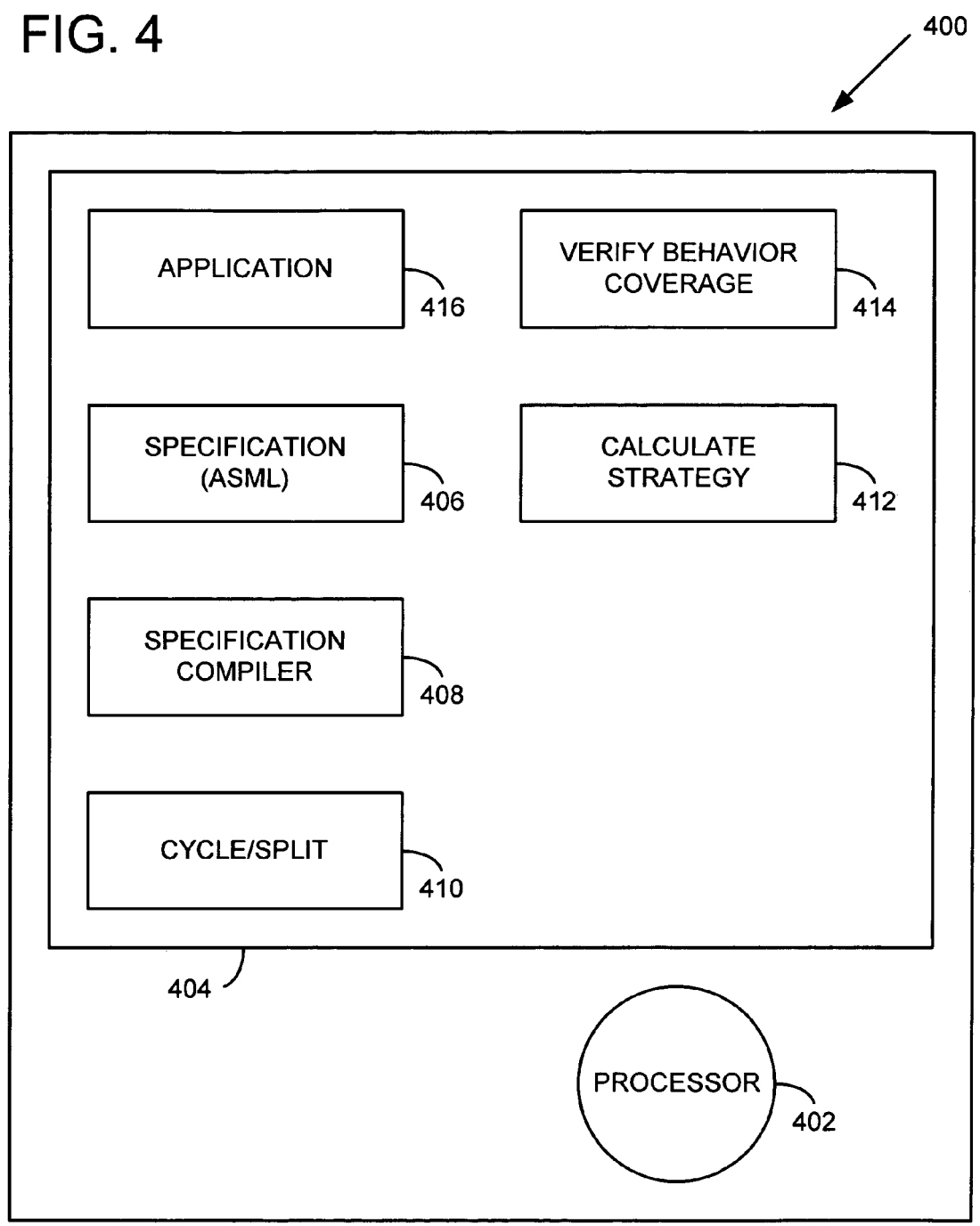
FIG. 4 is a block diagram of an exemplary system for testing non-deterministic programs.

FIG. 4 is a block diagram of an exemplary system for testing non-deterministic programs. The computer system 400 includes one or more processors 402 and a memory 404. The processor(s) execute programs which include instructions, data, and/or state. One or more programs execute modules 406-414, that create input or other testing conditions for testing other programs 416. A module is a function, method, component, thread, or process that performs a described service. Modules can be grouped or separated so long as they are available to perform a desired service.

An executable specification 406 defines desired program behavior or states. A specification compiler 408 creates a model for verifying a program's behavior. In one example, a model is represented as states and edges. A cycle module 410 creates a cycle through a model graph for providing edge or vertex coverage. In one example, a split module 410 converts a continuous cycle into sequences that do not contain non-deterministic vertices within a sequence. In one example, a continuous cycle is built according to a Chinese Postman algorithm, and the cycle is split into sequences ending at any non-deterministic vertex.

An application 416 is verified 414 to run according to an executable specification 406. In one example, a verifier module 414 determines whether split sequences created are traversed by a program under test. In another example, a strategy calculation module 412 creates strategies through a model that is more likely to reach a set of desired model vertices. In one such example, a program executed by the verifier with conditions (e.g., inputs or injected state conditions) corresponding to the created strategies, and the coverage is verified. In another example, a verifier first executes a program and records untouched sequences, and then the verifier executes the program with determined strategies to increase the probability of obtaining coverage of untouched vertices.

Exemplary Traversal of All Graph Edges

Figure 5:
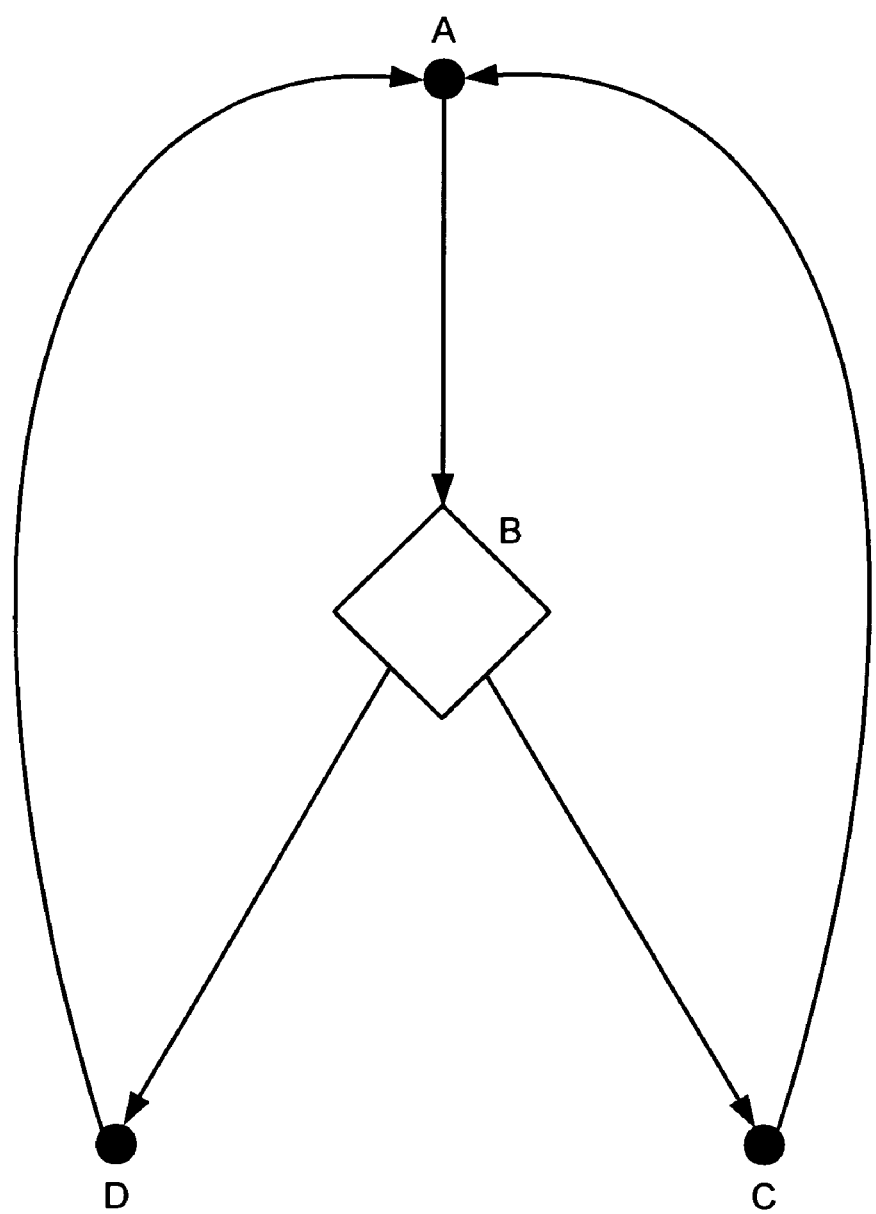
FIG. 5 is a graph of an exemplary strongly connected graph used to demonstrate how to split a Chinese Postman tour into sequences.

FIG. 5 is a graph of an exemplary strongly connected graph used to demonstrate how to split a Chinese Postman tour into sequences.

In this example, vertices A, D, and C are deterministic, and vertex B is non-deterministic. Traditionally, if vertex B were deterministic, a Chinese Postman tour algorithm would produce the edge sequence, T={AB, BC, CA, AB, BD, DA}, in one sequence.

The Chinese Postman tour is a tour covering edges of the graph with minimal cost. If the cost of every edge is 1 then the tour gives the minimal number of steps. In a testing environment, that includes a non-deterministic node, a test is unable to control which exit path is taken from non-deterministic node B, thus the Chinese Postman tour was not able to provide coverage of the edges for test cases.

Instead, the tour sequence is broken into sequences, such that after a choice is made at the non-deterministic node, the tour continues with a sequence containing a chosen edge. However, in this example, the sequence returns through a cycle back to the same choice point one or more times, with the understanding that with some probability, the non-deterministic node will eventually choose all exit edges thereby providing the desired test coverage.

For example, the above-described Chinese Postman tour sequence is split into the following sequences: $T_1$=[AB], $T_2$=[BC, CA, AB], and $T_3$=[BD, DA]. These sequences indicate that upon observing a non-deterministic choice BD or BC, a deterministic node D or C selects the next edge according to the Chinese Postman tour, and the cycle returns to the non-deterministic node one or more times, with the understanding that eventually the non-deterministic vertex B will choose another edge, thereby providing test coverage. In a global sense, by cycling through these sequences n times, the probability of full edge coverage approaches 1.

Exemplary Graph of Application States and Transitions

FIG. 2 is a graph diagram of exemplary states of an application under test. In this example, a testing environment has control over an application for many execution path decisions, but for other decisions the application has control. As shown in FIG. 2, graph vertices shown as points (e.g., A, B, V and D) are determined by a testing environment, and graph vertices shown as diamonds (e.g., G and C) are not controlled by the testing environment. For example, the application has control, a user has control or some unpredictable event has control (i.e., application environment has control). In this example vertices G and C are called choice points and vertices A, B, V, and D are called non-choice points. Thus, in this example an application environment has control over choice points and the testing environment has control over non-choice points.

In one such example, vertex A is a test environment controlled non-choice point. Thus, a test environment decides whether to take an edge from A to B or from A to C. Assume that it is desirable to reach a victory state of vertex V 204, preferably without reaching the defeat state of vertex D 206. As shown, three edges exit vertex G 208. Assume that the probability that any one edge taken, exiting G is one third. In this example, G is a choice point so the actual edge taken in any one exit from G is non-deterministic, but in this case the probability of exiting any edge is evenly distributed over the three possible exit edges. Further, vertex C is also a non-deterministic vertex (i.e., a choice point) and again this example assumes that the probability of exiting vertex C is evenly distributed over the two exits. In this example, the probability of exiting choice points (i.e., G and C) is evenly distributed, but this is not required.

TABLE A $S_1$ is empty
$S_2$ = AC, P = 1/2, cost = 2; BG, P = 2/3, cost = 2;
$S_3$ = AB, P = 2/3, cost = 3; BG, P = 2/3, cost = 2;
$S_4$ = AC, P = 3/4, cost = 4; BG, P = 2/3, cost = 2

Table A provides exemplary strategies for obtaining a victory state from a given vertex. In this example, a graph 200 is viewed as a game where non-deterministic choices are viewed as being made by the house, and deterministic edges are selected by a player. In Table A, a game strategy $S_1$, implies a strategy that arrives at the victory state "V", from a start state when a player has one deterministic move. $S_2$ implies a strategy that arrives at the victory state in two steps $S_3$ implies victory in three steps, etc.

As shown, strategy $S_1$ is an empty strategy since there is no victory available in the graph 200 in one step. The only way to reach V in one step is from G or C, and neither of these paths (GV or CV) would involve any deterministic steps. Strategy $S_2$ involves two or fewer steps, and the V can be reached in two steps from vertices B or A. As shown in the Table A, for strategy $S_2$, V is reached by a player move (test environment move) of AC, followed by a house move (application move) of CV that occurs with a probability of ½, at a cost of two edges. Additionally, $S_2$ also includes a strategy where V is reached by a player move of BF, followed by a house move of CV that occurs with a probability of ⅔, at a cost of two edges.

Exemplary Strategy Determination

Given a graph as input, along with an order for comparing probability-cost pairs (e.g., an order "O"), a desired vertex "v" to reach, and a natural number "n" representing a maximum number of edges to traverse, the following method finds a strategy S for the game $\Omega(v, n)$ such that S is a minimal strategy to v (or to set of desired vertices "V") according to O.

FIG. 6 is a program listing of an exemplary method that initializes data structures for determining a strategy through a non-deterministic graph.

Front is a set of vertices that initially equal the victory set P. The function S maps cross product V×{0..n} to E+{null} such that initially S(v) is null everywhere. The variable newfront is new generation of front and is initially empty. The input includes a probability function from V×{0..n} to real numbers for calculation of the probability. Additionally, for each non-deterministic vertex, edges that exit that vertex are assigned probabilities. These probabilities are used to compute probabilities of strategies as the algorithm walks backward through the graph from the victory set to the other vertices of the graph.

FIG. 7 is a diagram of an exemplary data structure initialized according to the program listing of FIG. 6. Initially Pr(x) is set equal to 1 for vertices in the victory set P, P×{0..n} and 0 for other vertices. The function C from the cross product V×{0..n} to real numbers gives the maximal cost path. Initially C is zero everywhere. FIG. 2 is a graph received as input to the initialization program listing. For this example, the victory set P is set equal to vertex "V".

As shown the graph includes identification of a set of victory vertices (i.e., "V") identified as P 602. The initialize continues by setting the probabilities, costs, and strategies of the victory set, for each strategy from 0 to n. Since V is the victory set, the probability of obtaining victory from vertex V is initialized to 1. Additionally, since no edges are required to obtain victory from the victory set, all costs are initialized to zero. Since there is no need to exit the victory state, the strategy is set to null for all victory states.

Strategies are computed for n steps, where steps are traversed edges. In this example, strategies are computed for each vertex for up to four steps (i.e., n=0 . . . 4). For example, since victory (i.e., vertex V) can be obtained from vertex A in two steps (i.e., AC and CV), a strategy with only two steps should be indicated as possible in the output when the data structure (i.e., FIG. 7) is populated with data.

Figure 8:
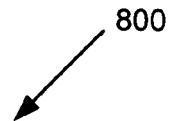
FIG. 8 is a program listing of an exemplary method for calculating and propagating graph strategies.

FIG. 8 is a program listing of an exemplary method for calculating and propagating graph strategies. For example, once a data structure is initialized as shown in FIG. 7, a method called Strategy Calculation 800 is called with an input value n 802. The input value n tells the method to determine an edge exiting each vertex that has the "best" order "O" relation for each number of steps from 0 to n, towards a victory vertex, from each vertex. Thus, if the victory set contains plural vertices, then a data structure such as FIG. 7 is computed for each vertex in the victory set (not shown).

For each value from 0 to n 804, the method processes each vertex in front 806, 808. Then the method 800 propagates the results to the vertices that reach the vertices in front directly 810-818. The method 800 then sets front equal to the vertices in newfront 820-824 and returns to process the vertices in newfront.

In this way, the method starts with front equal to the victory set, and steps backward from the victory set creating a newfront set. Thus, the method starts in the victory state(s) and walks backward through the graph, determining the probabilities, costs, and strategies, as the graph steps further and further from a victory state.

Assuming graph 200 as input with n=4, the strategy method 800 invokes a Process method 808 with vertex V 204 and i=1.

FIG. 9 is a program listing for comparing and propagating reaching strategies. For example, a Process method 902 is called from a calculation strategy 808. Since the graph 200 is used as an example input, and vertex V 204 is the only vertex presently in front, the only edges entering V are $GV_1$, $GV_2$, and CV. Thus, for each edge entering V 904, the method proceeds by setting u equal to the source vertices G, and C 906. Starting with u=G, since G is not in the victory set P 908, and since G is non-deterministic 910, 922, temporary variables old Pr 924 and old C 926 are set to valves Pr(G, 1) and C(G, 1) from the data in FIG. 7. Next, since i is presently equal to 1 928, the probability for the data structure at Pr(G, 1), is set equal to the probability of the edge GV multiplied by the probability of the present vertex being processed in front, as reflected in the data structure at Pr(V, 0) 932. Since the values in the data structure are being changed after initialization, they are changed in another copy of the data structure for illustration purposes.

Figure 10:
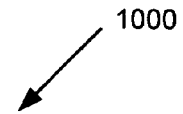
FIG. 10 is a diagram of the data structure of FIG. 7 with computed costs, probabilities, and strategies.

FIG. 10 is a diagram of the data structure of FIG. 7 with computed costs, probabilities, and strategies. Before computing a value for Pr(G, 1) 932, it is noted that in this example, the graph 200 includes two non-deterministic vertices G and C. Since it is unknown which edge the environment will select exiting G or C, it is assumed for this example that the probability is uniformly distributed against all edges exiting a non-deterministic vertex. Since G has three exit edges, each is assigned ⅓ probability. Since C has two exit edges, they are assigned ½ probability each. Thus, the equation Pr (u, i)+=p (edge)*Pr (v, i−1)932, is reduced to Pr (G, 1)=Pr (G, 1)+p (GV)*Pr (V, 0), or Pr (G, 1)=0+⅓*1, which equals ⅓. Thus, the data structure 1000 is updated with this value in Pr (G, 1).

Next, the costs are computed for C (G, 1) 934. For this example graph 200, it is assumed that all edges cost 1 unit. The equation computes the cost as the cost of this edge GV plus the cost at the target vertex V for i−1. Since the target vertex is presently in the victory set, all costs are zero for vertex V as shown in FIG. 7. Thus, the value cost(e)+C(e.target, i−1) reduces to 1+0 or "1". The second part of the equation 934, ": e exits from u", compares this computed cost "1" to the costs of reaching V via any of the other exit edges "e" from the source u. Since no other path costs are yet computed, the computed value "1" is now the max cost, so it is assigned to C (G, 1). Finally, since Pr (G, 1) is not equal to the saved oldPr, vertex G is added to newfront 936-938.

Similarly, the second edge entering V from G is computed 902-908, 922-926, 932-936, and the only edge entering V from C is computed, and the values are reflected in the table 1000. Since both edges GV and CV change data structure values, values 936, G and V are added to newfront 938. Since each edge entering V is computed 904, the process method returns 808, and Strategy Calculator starts processing 810-818 the G and V vertices in newfront. Simply put, the probabilities and costs computed for i=1 in G and C, are propagated through n=2 . . . 4 in the table for G and C. Next, front is set to newfront {G, C}, newfront is set to the null set 822, 824, and the method continues for i=2 804.

Since front now contains G and C, the method calls 808 Process (G, 2) and upon return, calls Process (C, 2). When the process method receives the call, since only B enters G 904, and B is deterministic 910, the method calls ImprovingOnEdge (BG, 2). The ImprovingOnEdge method 940, compares the costs and probabilities of two strategies in order to determine whether to change the recommended strategy for exiting B. Since B is deterministic, and since exiting any edge from a deterministic node is deterministic, the probability assigned to edge BF is 1, and the cost is the cost to reach the victory state from vertex G, plus the cost to reach G from B. Thus, the first part of the equation "(Pr (edge.target, i−1), cost(edge)+((edge.target, i−1))" is the probability and cost pair to reach V via B, as computed relative to G (since G is the target of edge). The second part of the comparison "(Pr (edge.source, i), C(edge.source, i) is a probability cost pair that may already exist in the data structure, if vertex B had already been visited via some other backward path through the graph. Thus, the equation 942 is used to determine a best strategy to recommend to reach V via vertex B. In this case, since Pr(B, 2) was initialized to, and remains zero, the probability to reach V via B is better through G. Thus, BG improves on the existing probability and the method sets the probability, cost and strategy for B accordingly 914-918, and B is added to newfront 920. Similarly, the process method 808 is called on Process (C, 2), and edges A and D entering C are improved on since they also contain zero probability. After probabilities and costs are updated for A and D, they are added to newfront 920.

Since A, B and D have been added to newfront, the strategies computed for i=2 are propagated through n=3 . . . 4 for A, B, and D 812-818. After front is set equal to newfront {A, B, D} 822, the method returns to process front with i=3 804-808. The method continues until the data structure is completed as shown 1000.

As shown in the data structure 1000, no strategy is recommended for non-deterministic vertices A and G. This is because the environment makes this choice, and a player (e.g., an application test developer) cannot make this choice anyway. It is valuable for the player to known that from vertex A, if n=3 (i.e., three edges are allowed), they have a ⅔ probability of reaching vertex V if they take strategy AB.

Exemplary Graph Definition

Let G be a directed graph (V, E) where V is a set of vertices and E is a set of edges. Some of the graph vertices are marked as non-deterministic. There is a function p from E to positive real numbers such that for every non-deterministic vertex v, the sum $\Sigma\{p(e)|$ e belongs to E and e exists from v$\}$=1. In other words, there are edges exiting the non-deterministic vertices of G. Further, for a given non-deterministic vertex of G, each edge exiting that vertex is assigned a probability, and the sum of those probabilities is one. Additionally, there is a non-negative cost function "cost" defined on the set of edges E. Thus, there is a cost assigned to each edge in the graph, whether exiting a deterministic or non-deterministic vertex.

Exemplary Reaching with Probability

In one example, a path through a graph including non-deterministic states is selected based on probability and cost. For example, let P be a subset of the vertices in graph G. An algorithm produces a path in G from a given vertex to P. Because G contains non-deterministic vertices, the set P can be reached sometimes only with some probability. One may also wish to minimize the cost of the path leading to P and maximize the probability to reach it.

In one example, the problem is viewed as a game (v, n) where v is a vertex to start from and n is a number of edges allowed in reaching P. In one example, there is one player playing against an environment. If a present state is deterministic, then the player chooses an edge exiting the state. If a present state is non-deterministic, then the environment chooses an outgoing edge. If a player reaches a desired set P in no more than n edges, the player wins. In this game, the environment chooses edges according to the probability p assigned to edges exiting the non-deterministic edges. A strategy S is an indication of an edge that is recommended to be taken to reach a desired state from a present state. In one such example, upon reaching the edge target, a next edge is recommended to proceed toward P from the target. The probability function Prob(S) from cross product $V \times \{0..n\}$ to the set of non-negative real number defined as $Prov(S)(v,k)$= probability of the player to win in the game starting from v for no more than k steps following the strategy S. The cost function Cost(S) from the cross product $V \times \{0..n\}$ to non-negative real numbers is defined as following: for vertex v in V, k in $\{0..n\}$, $Cost(S)(v,k)=0$ if no edge can be selected in the game (v,k) following the strategy S, otherwise Cost(v,k) is the cost of the most expensive path that can happen in the game (v,k) while following the strategy S.

Exemplary Path or Edge Comparisons

In order to compare two potential edge exits from a given vertex, probabilities and costs associated with reaching a desired vertex via each potential edge exit are considered.

Figure 11:
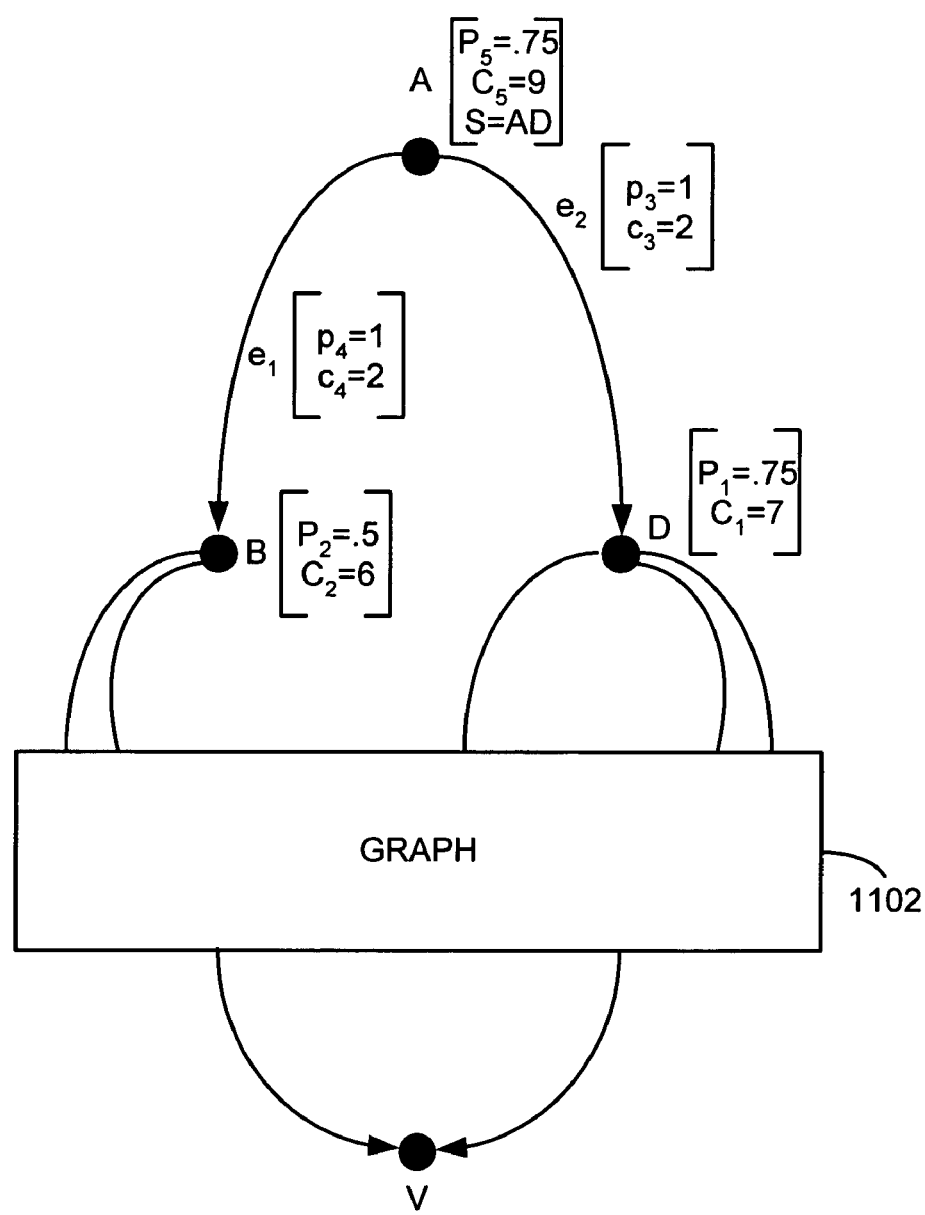
FIG. 11 is a graph of vertices and edges with assigned probabilities and costs.

FIG. 11 is a graph of vertices and edges with assigned probabilities and costs. In order to select a strategy $e_1$ or $e_2$ existing vertex A, probabilities and costs are compared. At any given present vertex, a capital P represents the probability of reaching a desired vertex "V", if a path is pursued through that present vertex, and a capital C represents a maximum cost to reach the desired vertex if a path is pursued through that present vertex. A lower case p represents a probability of one edge, and a lower case c represents a cost of one edge. With these definitions in mind, an order on probability cost pairs is considered.

An order $\preceq$ on Probability-Cost pairs (e.g., a set called Pairs), will help determine a minimal strategy S, where S is a function from the cross product of {deterministic vertices} $\times$ $\{0..n\}$ to the set of Edges $\cup$ null. If $\preceq$ is an order on pairs then strategies S, R can be compared by saying that $S \preceq R$ if for any vertex v in V and integer k in $\{0..n\}$ it holds that $(Prob(S)(v,k),Cost(S)(v,k)) \preceq (Prob(R)(v,k),Cost(R)(v,k))$.

An order $\preceq$ on Pairs is acceptable if (0,0) is the maximal element and for any elements from Pairs $(P_i,C_i)$, $(P'_i,C'_i)$, real numbers $p_i$ and $c_i$, i in $\{0, \ldots, m\}$ such that $(P_i,C_i) \preceq (P'_i,C'_i)$ for any i in $\{0, \ldots, m\}$, $p_0 P_0 + \ldots + p_m P_m = 1$, $x=(p_0 P_0 + \ldots + p_m P_m$, max $(c_0+C_0, \ldots, c_m+C_m))$, $y=(p_0 P'_0 + \ldots + p_m P'_m$, max $(c_0+C'_0, \ldots, c_m+C'_m))$, x and y belongs to Pairs then $x \preceq y$.

Deterministic vertices are controllable in the testing environment (i.e., as described as a player in a game scenario), thus the player can select vertex B via edge $e_1$ or D via edge $e_2$ when the player is in vertex A. As shown, vertex B represents a path of vertices through the graph 1102 that includes non-deterministic vertices with probability of 0.5 and a max cost of 6, and vertex D represents a path of vertices through the graph that includes non-deterministic vertices with probability 0.75 and a max cost of 10. Thus, using an order operator that multiplies probabilities through a path and sums costs, the probability cost pair of reaching V from A through B would be $(P_2 \cdot P_4, C_2+C_4)$, or (0.5, 8), and the probability cost pair of reaching V from A through D would be $(P_1 \cdot P_3, C_1+C_3)$ or (0.75, 8). Thus, an operator that favors probability would select strategy AD from vertex A, which goes through edge $e_2$, since it has a higher probability.

An example of an acceptable order is the lexicographical order on pairs where the first coordinates are assigned a negative sign before the comparison and all pairs with the first element zero are defined as maximal. In this example, simply put, for two potential exits from a vertex, a first strategy is better than a second strategy if by following the first strategy the player has higher probability to win while minimizing the cost.

Exemplary Strategies

A strategy Strategy(v,n) is defined for the game $\Omega(v, n)$ as follows; if k is the number of steps already taken by the game and the vertex v is deterministic then the player makes the move S(v,n−k) when S(v,n−k) is not null.

For any vertex v in V the following proposition is true: Prob(Strategy(v,n)) is equal to Pr(v,n) and Cost(Strategy(v, n)) is equal to C(v,n); and Strategy(v,n) for the game $\Omega(v, n)$ is a minimal strategy according to the acceptable order O.

Using induction by n, the proposition is true for n equal to 0 because the game $\Omega(v, 0)$ has no moves so there is only one strategy with no moves and the player wins if v belongs to P. So if S is a strategy for the game $\Omega(v, 0)$ then Prob(S)=Pr(v,0) and C(S)=C(v,0)=0, remembering that initially, Pr(v,0)=1 for each v from P.

Suppose that the proposition is true for integers less then n. If the vertex v is deterministic then the probability of winning the game $\Omega(v, n)$ following the strategy Strategy(v,n) is equal to the probability of winning the game $\Omega(e.target, n-1)$ following the strategy Strategy(e.target,n−1), which is Pr(e.target,n−1) where edge e is the first move made by the player, and the Cost(Strategy(v,n))=cost(e)+C(e.target,n−1). The function Process on the $n^{th}$ iteration of the external loop for a deterministic node will choose an edge e=S(v,n) in such a way that the pair (Pr(e.target,n−1),cost(e)+C(e.target,n−1)) is the minimum in the set {(Pr(edge,n−1),cost(edge)+C(edge.target,n−1)): edge exits from v} according to the order O. This proves that the Strategy(v,n) is optimal for the game $\Omega(v, n)$ for deterministic nodes.

For a strategy T for the game $\Omega(v, n)$ a strategy is defined as T'(edge.target,n−1) for the game $\Omega(edge.target,n-1)$ for every edge exiting v by repeating the moves of S if the first move in the game $\Omega(v, n)$ was made along the edge. It becomes apparent that Prob(T)=$\Sigma$\{p(l)Prob(T'(l.target,n−1)): l.source=v\} and Cost(S)=max \{(cost(l)+Cost(S(l.target, n−1))): l.source equals v\}. It is then concluded by inductive assumption that Prob(Strategy(v,n))=$\Sigma$\{p(l)Prob(Strategy (l.target,n−1)):l.source=v\}=$\Sigma$\{p(l)Pr(l.target,n−1):

l.source=v} and Cost(Strategy(v,n))=max {cost(l)+Cost(S (l.target,n−1))): l.source equals v}=max{cost(l)+C(l.target, n−1): l.source equals v}.

Further, by induction assumption for a strategy R, (Pr(u,n−1), C(u,n−1))≼(Prob(R((u,n−1)),C(R(u,n−1))) for any vertex u. The order O is acceptable; therefore (Prob(Strategy(v,n)), Cost(Strategy(v,n)))=(Σ{p(l)Pr(l.target,n−1): l.source=v}, max{cost(l)+C(l.target,n−1):l.source=v} ≼(Σ{p(l)Prob(R (l.target,n−1)):l.source=v},max{cost(l)+Cost(R(l.target,n−1)):l.source=v}=(Prob(R),Cost(R)).

It is also interesting to note that if k>0 is such a number that for any vertex v the number of edges incident to v is no more than k, then the algorithms runs for not more than O(n|V|k) steps, so the complexity of the algorithm is no worse than O(n|V||E|).

Exemplary Usage of the Chinese Postman Tour for Edge Coverage

In one example, the results of a Chinese Postman algorithm on a strongly connected graph G with deterministic and non-deterministic nodes are used to provide edge coverage.

For example, assume that T is a sequence of edges composing a Chinese Postman tour which is a cycle containing all edges of G and having the minimal cost. The sequence T can be represented as a concatenation of sequences $T_i$ where i changes from 1 to n such that every $T_i$ starts and ends at non-deterministic nodes and no non-deterministic nodes are internal to the sequences. FIG. 12 is a program listing of a method of cycle traversal used to obtain test coverage probabilistically.

For each node v and number i between 1 and n, $p_{iv}$ denotes the probability that the sequence $T_i$ will be covered by Traverse(v,n). Since T is a cycle $p_{iv}>0$ for every i from 1 to n and for every vertex v. If p is the minimum $p_{iv}$ {$p_{iv}$: i from 1 to n and v is non-deterministic node from V}, then p>0.

If m is a natural number, it is proposed that for any nondeterministic node v the procedure Traverse(v,mn) covers all edges with probability not less then $1-n(1-p)^m$ and therefore converges to 1 when m goes to infinity.

This is apparent when it is shown that Traverse(v,mn) covers all sequences $T_i$ with probability of at least $1-n*(1-p)^m$. Let $v_1=v$, $v_2$ the value of v after n steps of Traverse, and so on, then $v_m$ is the value of v after (m−1)n steps of Traverse. The probability that $T_i$ is not covered by mn steps of Traverse is $(1-p_{iv1})(1-p_{iv2})\ldots(1-p_{ivm})\leq(1-p)^m$. The probability that at least one sequence $T_i$ is not covered by mn steps of Traverse is not more than $n(1-p)^m$. Therefore the probability that all sequences $T_i$ are covered by nm steps of Traverse is not less then $1-n(1-p)^m$.

It is interesting to note some empirical evidence of this concept in the following statistics. Table B represents the coverage of sequences for a graph of a "binding engine" with n=39, 5 non-deterministic nodes, and with various runs with m set from 1 to 5.

TABLE B

| | m | | | | | | | | | | | | | | |
|---|---|---|---|---|---|---|---|---|---|---|---|---|---|---|---|
| | 1 | 1 | 1 | 2 | 2 | 2 | 3 | 3 | 3 | 4 | 4 | 4 | 5 | 5 | 5 |
| % of covered sequences | 49 | 62 | 54 | 77 | 85 | 77 | 92 | 92 | 88 | 100 | 98 | 100 | 100 | 100 | 100 |

Table C represents the coverage of sequences for a graph of an "Alternating bit protocol" with n=81, 40 non-deterministic nodes, and with various runs with m set from 1 to 5.

TABLE C

| | m | | | | | | | | | | | | | | |
|---|---|---|---|---|---|---|---|---|---|---|---|---|---|---|---|
| | 1 | 1 | 1 | 2 | 2 | 2 | 3 | 3 | 3 | 4 | 4 | 4 | 5 | 5 | 5 |
| % of covered sequences | 74 | 70 | 74 | 88 | 88 | 83 | 94 | 95 | 90 | 94 | 95 | 96 | 98 | 99 | 98 |

Table D represents the coverage of sequences for a graph of a "stack" with n=100, 32 non-deterministic nodes, and with various runs with m set from 1 to 5.

TABLE D

| | m | | | | | | | | | | | | | | |
|---|---|---|---|---|---|---|---|---|---|---|---|---|---|---|---|
| | 1 | 1 | 1 | 2 | 2 | 2 | 3 | 3 | 3 | 4 | 4 | 4 | 5 | 5 | 5 |
| % of covered sequences | 66 | 58 | 60 | 87 | 82 | 77 | 90 | 93 | 90 | 96 | 93 | 94 | 97 | 95 | 96 |

The statistics show that coverage of at least 90% of a graph is often provided if 3 times as many sequences are traversed than there are in the Chinese Postman tour. In these examples if a non-deterministic node has k edges then the probability to follow one of the edges is equal to 1/k. These examples came from real test models.

Exemplary Combining of Edge Coverage Techniques

In providing coverage for an application under test, a combination of the described procedures can be used.

In one example, a sequence of edges identified from a Chinese Postman tour is used to obtain overall high probability for global graph coverage. Then, for uncovered edges, a graph is traversed to find strategies that reach the uncovered edges with some probability.

Exemplary Assignment of Edge Probabilities

In a non-deterministic setting, probabilities are assigned to edges exiting a choice point. In one example, edges are assigned probabilities evenly. Thus, the probability assigned to each edge is one divided by the number of edges. However, this is not required. Developers or test teams often know or suspect that an applicant is likely to have an uneven distribution of exits from a choice point.

In such an example, developer or test teams assign probabilities to edges exiting a choice point. In other cases, an application is instrumented with code for counting exits from choice points. In such an example, choice points are assigned according to the distribution of counted exits from choice points. In another example, the probabilities of edges exiting a choice point are known based on the underlying nature of an application or prior known behavior of an application, or class of applications.

For example, in an application that provides a blackjack gaming experience, some states are deterministic while other states are non-deterministic. If an application deals virtual cards to a game user, the user decides to hit or stand. If a player hits and busts, the house wins. If the player stays, or hits and stays, and the player has a better hand, the player wins. If such a program is tested, it is desirable to create a tree of states and edges representing all possible states of the cards dealt to and held by the house and player. In one example, since each combination of cards leading to a bust or win can be held by the house or player, a finite state machine representing these combinations is created in order to test the application's behavior.

Figure 13:
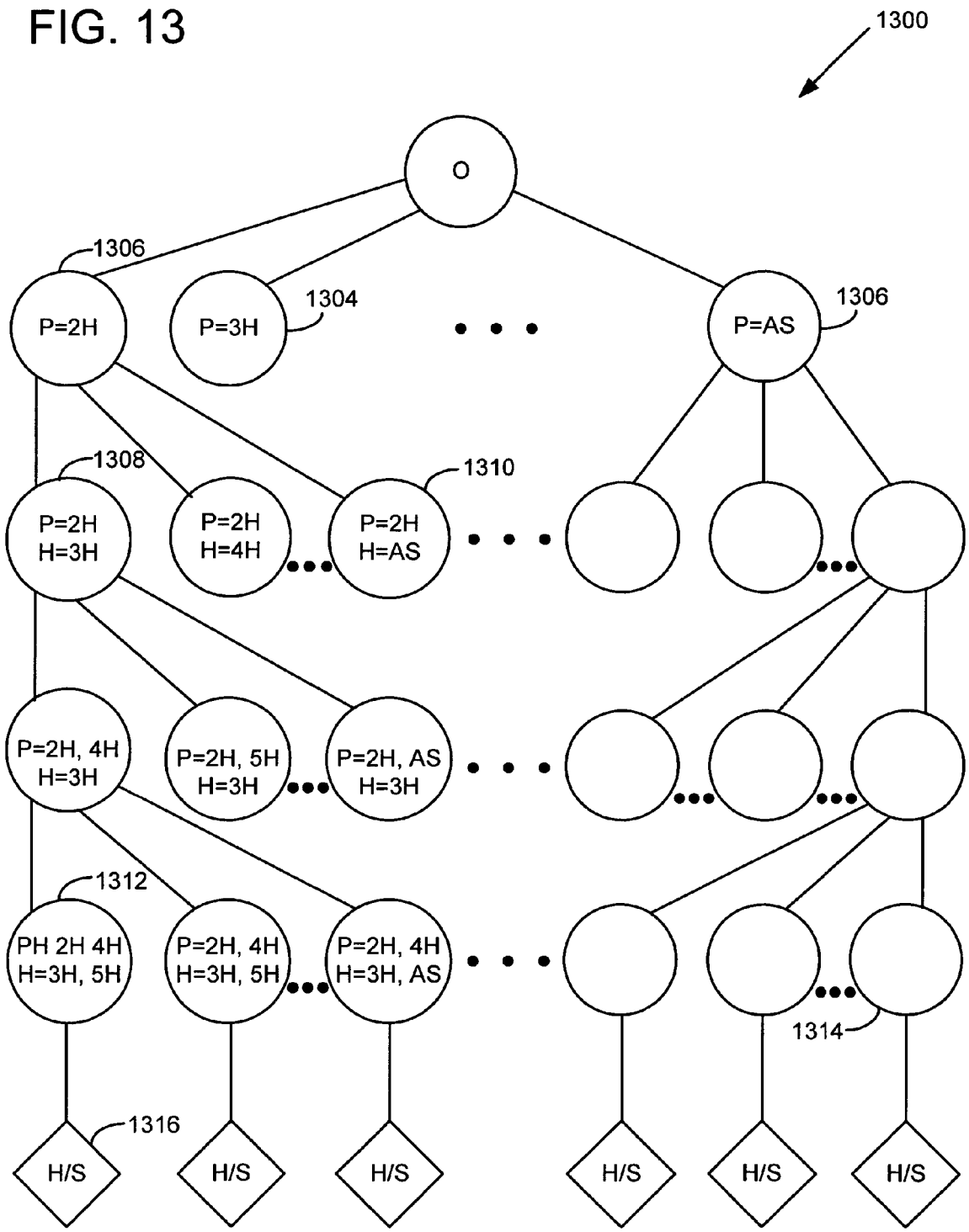
FIG. 13 is a diagram of an exemplary finite state machine with deterministic and non-deterministic states.

FIG. 13 is a diagram of an exemplary finite state machine with deterministic and non-deterministic states. As shown, a blackjack application comprises states for cards received by a player "P" and the house "H". In this example, it is deterministic that a blackjack application will deal a first card to a player which can be any card in the deck from the two of hearts 1302 through the ace of spades 1306. It is also deterministic that once the first card is drawn as shown 1302-1306, a first card to the house must come from the remaining cards in the deck. Thus, a testing environment is developed to exercise the various states achievable by a blackjack application. As shown 1312, the player has two cards (i.e., two and four of hearts) and the house has two cards (i.e., three and five of hearts). The finite state machine (FSM) includes non-redundant combinations of two cards for the player and house 1312, 1314.

For each non-redundant combination, the FSM then includes a non-deterministic state since it is unknown whether a player will hit or stand once they have received their cards. However, based on past behavior or suspected behavior, it is assumed that a player will hit 1316, on some combinations of cards 1312. In such examples, the probability that a player will hit on a choice point is very high, so the probability may reflect this knowledge (e.g., hit=99%, stand=1%). Of course, probabilities assigned to choice points will vary greatly based on an application under test.

In another example, a network protocol is under test. In one example, if statistics show that one of every hundred packets is lost by the network, then a choice point reflecting this non-deterministic behavior is assigned 99% for a successful packet send and 1% for an unsuccessful packet send. Thus, probabilities assigned to non-deterministic behaviors may be obtained from suspected behaviors, empirical evidence, known environment conditions, or distributed evenly across exit edges.

It is interesting to note that the deterministic nodes of the graph are those nodes that are controlled by the testing environment or model, and the non-deterministic nodes represent state(s) not controllable by the testing environment. In this case, the testing environment controls the cards dealt to the user. However, if the testing environment controls hit or stand, then graph would show the cards dealt as non-deterministic nodes. In either case, the goal is to provide coverage of an application with some probability despite non-determination.

Computing Environment

Figure 14:
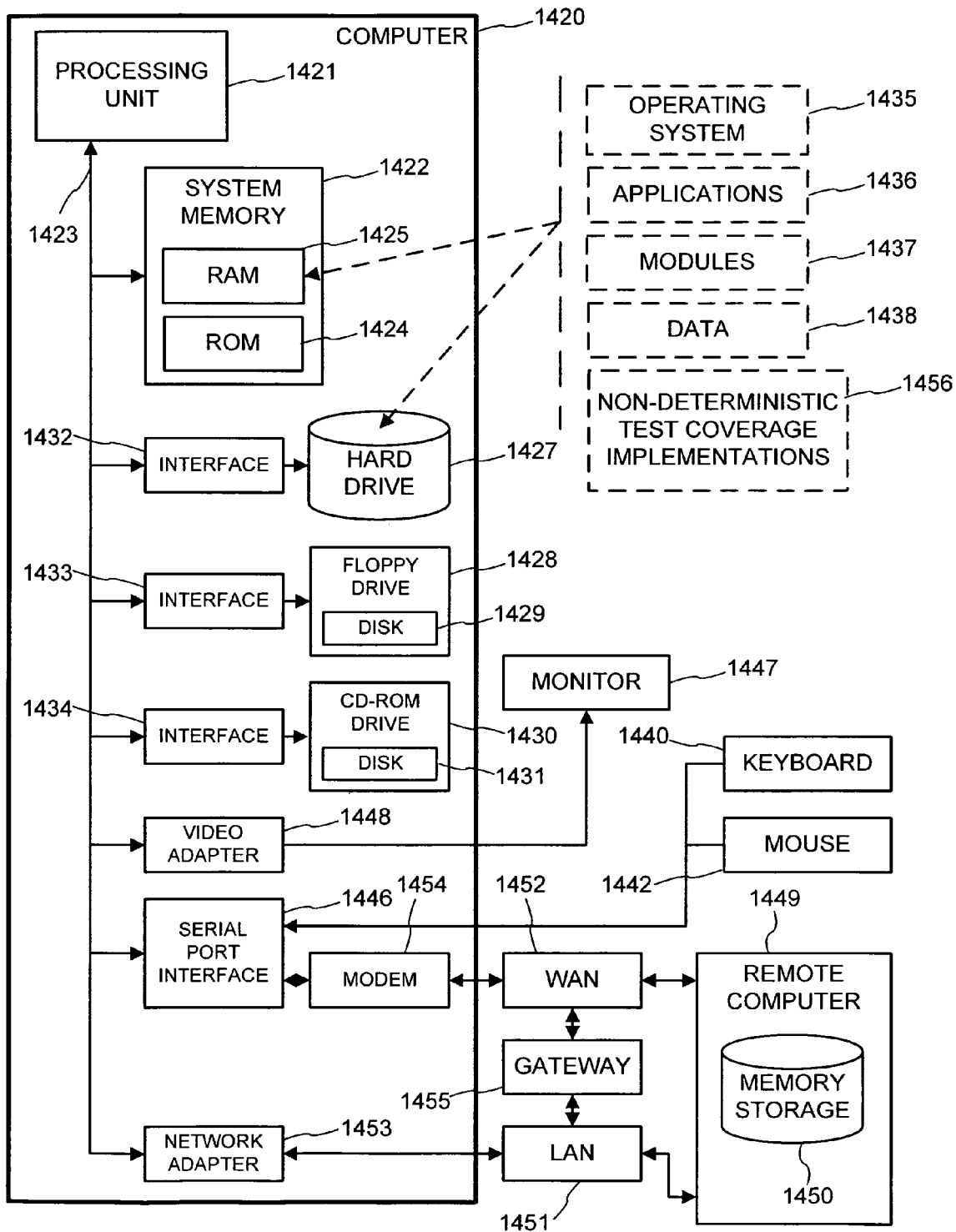
FIG. 14 is a block diagram of a distributed computer system implementing the described technologies.

FIG. 14 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 14, an exemplary system for implementation includes a conventional computer 1420 (such as personal computers, laptops, servers, mainframes, and other variety computers) includes a processing unit 1421, a system memory 1422, and a system bus 1423 that couples various system components including the system memory to the processing unit 1421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1421.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1424 and random access memory (RAM) 1425. A basic input/output system (BIOS), containing the basic routines that help to transfer information between elements within the computer 1420, such as during start-up, is stored in ROM 1424.

The computer 1420 further includes a hard disk drive 1427, a magnetic disk drive 1428, e.g., to read from or write to a removable disk 1429, and an optical disk drive 1430, e.g., for reading a CD-ROM disk 1431 or to read from or write to other optical media. The hard disk drive 1427, magnetic disk drive 1428, and optical disk drive 1430 are connected to the system bus 1423 by a hard disk drive interface 1432, a magnetic disk drive interface 1433, and an optical drive interface 1434, respectively. The drives and their associated computer-readable media provide nonvolatile storage of data, data structures, computer-executable instructions, etc. for the computer 1420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1425, including an operating system 1435, one or more application programs 1436, other program modules 1437, and program data 1438; in addition to an implementation 1456 of providing models and test coverage for non-deterministic programming as taught herein.

A user may enter commands and information into the computer 1420 through a keyboard 1440 and pointing device, such as a mouse 1442. These and other input devices are often connected to the processing unit 1421 through a serial port interface 1446 that is coupled to the system bus, but may be connected by other interfaces, such as a parallel port, game port or a universal serial bus (USB). A monitor 1447 or other type of display device is also connected to the system bus 1423 via an interface, such as a video adapter 1448. In addition to the monitor, computers typically include other peripheral output devices (not shown), such as speakers and printers.

The computer 1420 operates in a networked environment using logical connections to one or more remote computers, such as a remote computer 1449. The remote computer 1449 may be a server, a router, a peer device or other common network node, and typically includes many or all of the elements described relative to the computer 1420, although only a memory storage device 1450 has been illustrated. The logical connections depicted include a local area network (LAN) 1451 and a wide area network (WAN) 1452. Such networking environments are commonplace in offices, enterprise-wide computer networks, intranets and the Internet.

When used in a LAN networking environment, the computer 1420 is connected to the local network 1451 through a network interface or adapter 1453. When used in a WAN networking environment, the computer 1420 typically includes a modem 1454 or other means for establishing communications (e.g., via the LAN 1451 and a gateway or proxy server 1455) over the wide area network 1452, such as the Internet. The modem 1454, which may be internal or external, is connected to the system bus 1423 via the serial port interface 1446. In a networked environment, program modules depicted relative to the computer 1420, or portions thereof, may be stored in the remote memory storage device. It will be appreciated that the network connections shown are exemplary and other means of establishing a communications link between the computing devices may be used, wireless or otherwise.

Alternatives

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A computerized method of creating test coverage for non-deterministic programs within a testing environment comprising:

in a computer, receiving a graph of edges and states representing a program under test, the states comprising a plurality of deterministic states controllable by the testing environment and a plurality of non-deterministic states uncontrollable by the testing environment, wherein a plurality of the edges represent non-deterministic choices associated with at least one of the non-deterministic states and the edges representing non-deterministic choices are assigned respective probabilities;

creating a continuous cycle of edges and states through the graph that reaches each state in the graph at least once;

splitting the continuous cycle into discrete sequences that end at the non-deterministic states;

executing the program under test under test conditions as a first execution of the program;

determining discrete sequences not reached by the first execution of the program;

determining untested states as states in the discrete sequences not reached by the first execution of the program;

creating strategies through the graph to reach the untested states, wherein creating strategies comprises (a), (b), and (c):

(a) starting from a given untested state out of the untested states, traversing the graph backwards and computing costs and probabilities at states with a respective edge reaching the given untested state, wherein probabilities are assigned based on likelihood that an edge exiting a respective non-deterministic state uncontrollable by the testing environment will be selected during execution;

(b) assigning probabilities and costs to respective vertices based on a probability of providing a path to the given untested state; and (c) choosing vertices such that a next state with a lower cost and higher probability is preferred over a next state with higher cost and lower probability, wherein the strategies comprise respective series of one or more edge transitions through the graph;

storing a representation of the created strategies in computer memory; and in the computer, executing the program under test under test conditions as a subsequent execution of the program to the first, the subsequent execution using the created strategies such that the subsequent execution has a higher probability than the first execution of the program to execute through states that correspond to the untested states, wherein the subsequent execution repeats at least one of the strategies and presents the non-deterministic choices from at least one of the non-deterministic states a plurality of times during the subsequent execution, whereby a possibility of reaching at least one of the untested states is increased.

2. The method of claim 1 wherein the continuous cycle of edges is created from the graph using a Chinese Postman tour algorithm.

3. The method of claim 1 wherein the states of the graph are received as a set of deterministic vertices and a set of non-deterministic vertices.

4. The method of claim 1 wherein assigning the probability comprises determining a number of edges leaving the non-deterministic state as k, and calculating the probability as 1/k.

5. A computer system comprising:

memory and a central processing unit executing computer-executable instructions for creating test coverage for non-deterministic programs within a testing environment, the computer-executable instructions operating to:

receive a graph of edges and states representing a program under test, the states comprising a plurality of deterministic states controllable by the testing environment and a plurality of non-deterministic states uncontrollable by the testing environment, wherein a plurality of the edges represent non-deterministic choices associated with at least one of the non-deterministic states and the edges representing non-deterministic choices are assigned respective probabilities;

create a continuous cycle of edges and states through the graph that reaches each state in the graph at least once;

split the continuous cycle into discrete sequences that end at the non-deterministic states;

execute the program under test under test conditions as a first execution of the program;

determine discrete sequences not reached by the first execution of the program;

determine untested states as states in the discrete sequences not reached by the first execution of the program;

create strategies through the graph to reach the untested states, wherein creating strategies comprises (a), (b), and (c):

(a) starting from a given untested state out of the untested states, traversing the graph backwards and computing costs and probabilities at states with a respective edge reaching the given untested state, wherein probabilities are assigned based on likelihood that an edge exiting a respective non-deterministic state uncontrollable by the testing environment will be selected during execution;

(b) assigning probabilities and costs to respective vertices based on a probability of providing a path to the given untested state; and (c) choosing vertices such that a next state with a lower cost and higher probability is preferred over a next state with higher cost and lower probability, wherein the strategies comprise respective series of one or more edge transitions through the graph;

store a representation of the created strategies in the memory; and execute the program under test under test conditions as a subsequent execution of the program to the first, the subsequent execution using the created strategies such that the subsequent execution has a higher probability than the first execution of the program to execute through states that correspond to the untested states, wherein the subsequent execution repeats at least one of the strategies and presents the non-deterministic choices from at least one of the non-deterministic states a plurality of times during the subsequent execution, whereby a possibility of reaching at least one of the untested states is increased.

6. The system of claim 5 wherein the continuous cycle is determined according to a Chinese Postman algorithm.

7. The system of claim 5 wherein the discrete sequences comprise beginning states reachable from edges exiting non-deterministic states.

8. The system of claim 5 wherein a discrete sequence not reached by the first execution of the program is a state selectable from a program code executing at a remote computer.

9. A tangible computer-readable storage medium having thereon computer-executable instructions for performing a method of creating test coverage for non-deterministic programs within a testing environment, the method comprising:

in a computer, receiving a graph of edges and states representing a program under test, the states comprising a plurality of deterministic states controllable by the testing environment and a plurality of non-deterministic states uncontrollable by the testing environment, wherein a plurality of the edges represent non-deterministic choices associated with at least one of the non-deterministic states and the edges representing non-deterministic choices are assigned respective probabilities;

with a Chinese Postman tour technique, creating a continuous cycle of edges and states through the graph that reaches states in the graph at least once;

splitting the continuous cycle into discrete sequences so the discrete sequences end with a non-deterministic state;

executing the program under test under test conditions as a first execution of the program;

determining discrete sequences not reached by the first execution of the program;

determining untested states as states in the discrete sequences not reached by the first execution of the program;

creating strategies through the graph to reach the untested states, wherein creating strategies comprises (a), (b), and (c):

(a) starting from a given untested state out of the untested states, traversing the graph backwards and computing costs and probabilities at states with a respective edge reaching the given untested state, wherein probabilities are assigned based on likelihood that an edge exiting a respective non-deterministic state uncontrollable by the testing environment will be selected during execution;

(b) assigning probabilities and costs to respective vertices based on a probability of providing a path to the given untested state; and (c) choosing vertices such that a next state with a lower cost and higher probability is preferred over a next state with higher cost and lower probability, wherein the strategies comprise respective series of one or more edge transitions through the graph;

storing a representation of the created strategies in computer memory; and in the computer, executing the program under test under test conditions as a subsequent execution of the program to the first, the subsequent execution using the created strategies such that the subsequent execution has a higher probability than the first execution of the program to execute through states that correspond to the untested states, wherein the subsequent execution repeats at least one of the strategies and presents the non-deterministic choices from at least one of the non-deterministic states a plurality of times during the subsequent execution, whereby a possibility of reaching at least one of the untested states is increased.

10. The computer-readable storage medium of claim 9 wherein at least one of the non-deterministic states represents behavior comprising communications with a remote computer.

* * * * *

UNITED STATES PATENT AND TRADEMARK OFFICE
CERTIFICATE OF CORRECTION

PATENT NO. : 7,590,520 B2  Page 1 of 1
APPLICATION NO. : 10/758797
DATED : September 15, 2009
INVENTOR(S) : Nachmanson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 863 days.

Signed and Sealed this

Twenty-first Day of September, 2010

David J. Kappos
*Director of the United States Patent and Trademark Office*